Patented Jan. 30, 1940

2,188,734

UNITED STATES PATENT OFFICE 2,188,734

SELECTIVE HERBICIDE

Thomas S. Carswell, Glendale, Mo., assignor to Monsanto Chemical Company, St. Louis, Mo., a corporation of Delaware No Drawing. Application March 24, 1938, Serial No. 197,963

9 Claims. (Cl. 167—45)

The present invention relates to methods for the control and destruction of weeds and has for its object the provision of a herbicide for this purpose which will be selective in action and more efficacious than the substances at present in use for such destruction of weeds. The invention is based upon my discovery that polychlorinated phenols, particularly in the form of their alkali-metal salts, are especially efficacious materials for this purpose.

Weeds, as is well known, are a menace to growing crops. Some control of weeds can be attained by proper destruction of the weed prior to the seed-forming stage. This, however, is not always possible. When the weed has begun to grow, the most effective method for its destruction is hand picking or mechanical removal, but such procedures are expensive and are not economically feasible for use on large tracts of cultivated land. A wide variety of chemical substances which destroy the weed by chemical action has been suggested, and several such substances have come into rather extensive use as herbicides. The chemical substances, to be effective as herbicides, must destroy the weed without substantial deleterious after effects upon the other desirable plants. Those which have been suggested and many of which have been used with some success meet this primary requisite only to variable degrees, but none is entirely satisfactory. The herbicides heretofore used are destructive to weeds of certain less resistant varieties, such as shallow-rooted perennial weeds, but are without substantial effect on more refractory or resistant weeds. The quantity of some herbicides necessary to produce a beneficial effect, and their high cost, have seriously limited the extended use of these materials. Some herbicides, though used with some success, are a fire hazard and a possible hazard to health.

Of all the materials suggested as herbicides, those which have been most extensively used are sodium chlorate and chlorates of other metals, sodium arsenite and other arsenic derivatives, calcium cyanamide, ammonium thiocyanate and sulfuric acid. The most outstanding disadvantages of these materials are as follows:

Sodium chlorate is possibly the best known of all herbicides, but requires considerable quantities for effective control. It kills shallow-rooted annual weeds, but is relatively ineffective in destroying deep-rooted weeds. Sodium chlorate is a fire hazard and requires special precautions in its use, even in solution. The chemical has a deleterious residual effect on the soil and has been found in some cases to reduce the yields of crops obtained from a particular soil, especially in the following year. Furthermore, it has also been observed that, although sodium chlorate kills weeds, mushroom and fungous growths are increased.

Sodium arsenite and arsenic compounds are somewhat more expensive than sodium chlorate and present a hazard to health. Generally more arsenite than chlorate is required to produce the same effective control.

Ammonium thiocyanate is even less effective than sodium chlorate and therefore requires greater quantities for effective control.

Sufuric acid is not selective, that is, it destroys the crop as well as the weeds. Its principal application is along railroad rights of way and for making clearings.

Sodium cyanide, sodium dichromate, phenols and certain other materials produce more rapid killing of weeds than sodium chlorate, sodium arsenite or ammonium thiocyanate, but are valueless because of the appearance of a new growth of weeds in as little as three weeks after treatment. Furthermore, they lose their toxicity in the soil and do not attack the roots.

Carbon bisulfide has been applied to the soil but because of its volatility and high cost of application, is usable only on small areas. It does not give a sufficiently permanent treatment and is a very flammable material. Methods for its application to the soil on a large scale are insufficiently developed.

Herbicides do not all act on weeds by virtue of the same chemical action. The varied chemical nature of the herbicides listed above indicates that undoubtedly each acts in a characteristic manner. In general, it may be said that herbicides can act to produce—

1. Contact killing (sulfuric acid is evidently of this class)
2. Pathological disturbances of surface roots resulting in a stunted chlorotic growth.
3. Deep penetration and killing of roots under conditions which favor downward translocation through the xylem
4. Root absorption, following the percolation of the chemical into the soil Sodium chlorate effectiveness depends largely upon root absorption. On the other hand, sodium arsenite is not absorbed by plant roots. Contact killing, if sufficiently selective, is the preferred type, of course, since it is most economical of chemicals. In order to provide the material in proper form, it is desirable to known whether the material kills through absorption by or destruction of the roots or by contact. Determination of the mode of action of the herbicide is in many cases difficult, and no doubt some of them act in more than one of the above manners.

I have discovered that polychlorinated phenols, and especially tetra- and penta- chlorophenols, which may be applied in the form of water-soluble sodium or alkali-metal salts, are effective herbicides for the control of weeds. Besides being especially active, that is, requiring considerably smaller quantities than is usual with sodium chlorate or sodium arsenite, they are without substantial residual effect on the soil. The polychlorophenols, besides destroying weeds, remain in contact with the soil and prevent mold, mushroom and fungous growths appearing subsequent to the eradication. There is also no immediate appearance of regrowths. The quantity of the polychlorophenol remaining on the soil is small, depending on the method of application, but this small proportion is not rapidly dissolved and percolated through the soil and remains to prevent mold or fungous growths without affecting the growth of desirable plants. The materials present no fire hazard nor any great health hazard. Polychlorophenols are particularly effective when sprayed as sodium salts in aqueous solution onto the plants and I therefore believe that they act as a result of contact of the foliage with the herbicides and are probably absorbed by the foliage thereafter. However, absorption by roots or destruction of the roots probably also occurs.

In using my invention, the customary methods of applying herbicides are used. Preferably I apply the herbicide as a sodium salt in water solution of a suitable concentration, but it may also be applied as the free polychlorophenol in an oil solution, for example, in solution in various petroleum distillates (such as Midcontinent No. 2 fuel oil) which themselves have some herbicidal value. The application is made preferably early in the spring when the weeds are small and succulent. Applications later in the year, when the weeds are fully matured, require considerably greater quantities of herbicide to obtain coverage of the foliage and generally require greater concentrations because of the increased resistance of the weed.

The concentration of the polychlorophenol herbicide to use for any particular weed is dependent to some extent upon the character of the weed and the surrounding vegetation and the particular polychlorophenol being used. Generally an aqueous solution containing 1% or less of sodium pentachlorophenate, for example, is satisfactory for most purposes. Greater concentrations can be used and are advisable for more resistant weeds. When weeds among growing crops are to be destroyed, a greater degree of care must be exercised in selection of the proper concentration. No general rule can be set out since each individual case presents individual problems, although it may be stated that the herbicides of the present invention are remarkably selective and that there is a rather wide range of concentrations between that necessary to kill the weed and that which has a substantial deleterious action on the growing crop. For those purposes, where a growing crop is not a consideration, the maximum concentration is not of prime importance.

When the polychlorophenol is used as a sodium salt, the carbon dioxide of the air and any acidity of the soil serve to liberate the phenol in the free substantially water-insoluble form. The phenol is probably more readily absorbed by the weed in the water-soluble form and therefore to delay this transformation to the water-insoluble form on contact with air it is sometimes advantageous to add free alkali to the herbicide solution. In such a case the alkali itself has a beneficial herbicidal effect also, as is known, but its concentration must be carefully controlled to prevent injury to other plants.

By the term "polychlorophenol", as used in this specification is to be understood pentachlorophenol and its alkali-metal salts, as well as isomeric tetrachlorophenols, or mixtures thereof and their sodium, potassium, or other alkali-metal salts. The polychlorophenols may be substituted by alkyl groups, that is, they may be chlorinated homologues of phenol such as tetrachlorocresol, etc.

The weeds for the control of which the invention is particularly beneficial include such diverse plants as: Field bindweed (Convolvulus arvensis), hedge bindweed (Convolvulus sepium), couch grass (Cynodon dactylon), water cress (Nasturtium officinale), wire weed (Polygonum aviculare), beard grass (Polypogon monspeliensis), castor-oil plant (Ricinus communis), dock weed (Rumex sp.), nightshade (Solanum nigrum), fleabane or horseweed (Erigeron canadensis), spurge (Euphorbia geniculata), chickweed (Stellaria media), nut grass (Cyprus esculentus), white top (Lepidium draba), sunflowers (Helianthus sp.), prickly lettuce (Lactuca scariola), horse tails (Equisetum arvense) and crab grasses (Syntherisma sanguinalis). As previously stated, when making clearings or de-weeding railroad rights of way, irrigation-ditch banks etc., complete denudation may be made with solutions of greater than 1% concentration of the polychlorophenol. However, for de-weeding cultivated ground containing growing crops, the adjustment of concentration must be made with greater care and some of the more hardy weeds may undergo only slight permanent injury at the maximum concentrations of the herbicide that can be used without substantial damage to the desirable crop.

The herbicides of the invention are also useful for preventing so-called brown patch on lawns, golf greens and the like. Brown patch is a fungous growth and can be eliminated by spraying the lawns or greens with dilute solutions of polychlorophenols. Fungous and mold growths on the soil or on plants are likewise destroyed by the treatment of the present invention.

In preparing herbicidal solutions various materials of a secondary nature may be added to the compositions. Thus, for example, it is advantageous to add a wetting agent such as a sulfated alcohol, or an alkylated aromatic sulfonic acid such as an alkyl-naphthalene sulfonic acid or the product known under the trade-name of "Santomerse", to facilitate spreading of the composition over the foliage of the weed. Gums such as Karaya gum may be added to increase the adherence of the composition to the foliage. The compositions may be clear aqueous solutions of the polychlorophenol salts or oil solutions of the free phenol, or they may be emulsions. When used as emulsions, gums are desirable secondary constituents. Application of the polychlorophenol or its salts in the form of a dust may be successfully accomplished but is less desirable than other methods of application since care is necessary to protect the body from the irritating effects of the polychlorophenol.

Inasmuch as the foregoing specification comprises preferred embodiments which are illustrative rather than limitative, it is to be understood that modifications and changes may be made in the invention without substantial departure therefrom and that the invention is limited solely by the appended claims.

I claim:

1. A herbicide comprising a substance selected from the group consisting of pentachlorophenol, tetrachlorinated benzene hydrocarbons substituted in the aromatic nucleus by a hydroxyl group, and alkali-metal salts thereof.

2. A herbicide comprising pentachlorophenol.

3. A herbicide comprising sodium pentachlorophenate.

4. A herbicide comprising a tetrachlorophenol.

5. A method for the control of weeds which consists in applying to the weeds and the ground on which they are growing a herbicide comprising a substance selected from the group consisting of pentachlorophenol, tetrachlorinated benzene hydrocarbons substituted in the aromatic nucleus by a hydroxyl group, and alkali-metal salts thereof.

6. A method for the control of weeds which consists in applying to the weeds and the ground on which they are growing a herbicide comprising an aqueous solution of an alkali-metal salt of a phenol selected from the group consisting of pentachlorophenol and tetrachlorinated benzenes substituted in the aromatic nucleus by a hydroxyl group.

7. A method for the control of weeds which consists in applying to the weeds and the ground on which they are growing a herbicide comprising pentachlorophenol.

8. A method for the control of weeds which consists in applying to the weeds and the ground on which they are growing a herbicide comprising sodium pentachlorophenate.

9. A method for the control of weeds which consists in applying to the weeds and the ground on which they are growing a herbicide comprising a tetrachlorophenol.

THOMAS S. CARSWELL.